United States Patent [19]

Bradley

[11] 4,217,813
[45] Aug. 19, 1980

[54] POWER STEERING GEAR WITH DELASHED PISTON NUT AND SCREW THREADING

[75] Inventor: Arthur W. Bradley, Saginaw, Mich.

[73] Assignee: General Motors Corporation, Detroit, Mich.

[21] Appl. No.: 945,786

[22] Filed: Sep. 25, 1978

[51] Int. Cl.² .............................................. F15B 9/10
[52] U.S. Cl. .......................... 91/375 A; 74/424.8 R; 85/1 F; 151/7; 277/12
[58] Field of Search ................. 91/375 A, 375 R, 380; 151/7; 85/1 F; 277/12; 74/424.8 R

[56] References Cited

U.S. PATENT DOCUMENTS

| 33,487 | 10/1861 | Marsh | 151/7 |
|---|---|---|---|
| 2,318,415 | 5/1943 | Patzschke et al. | 151/7 |
| 2,407,160 | 9/1946 | Kahn | 151/7 |
| 2,428,783 | 10/1947 | Cole | 151/14 R |
| 4,009,641 | 3/1977 | Rohde et al. | 91/375 A |
| 4,036,110 | 7/1977 | Galonska et al. | 91/375 A |

*Primary Examiner*—Paul E. Maslousky
*Attorney, Agent, or Firm*—Charles R. White

[57] ABSTRACT

Power steering gear with integral rotary valve for directing hydraulic pressure fluid to and from a piston nut and in which an elongated screw threaded through the piston nut is slit longitudinally to give the metallic screw a barrel-shape configuration with outwardly sprung sides. The sides of the screw are radially compressed inwardly by the piston nut when it is threaded through the piston nut to provide for a close fit between the meshing helical threads of the piston nut. Improved fluid sealing is provided by this construction with the slot being filled with a yieldable elastomer material which engages the helical threads of the piston nut.

3 Claims, 3 Drawing Figures

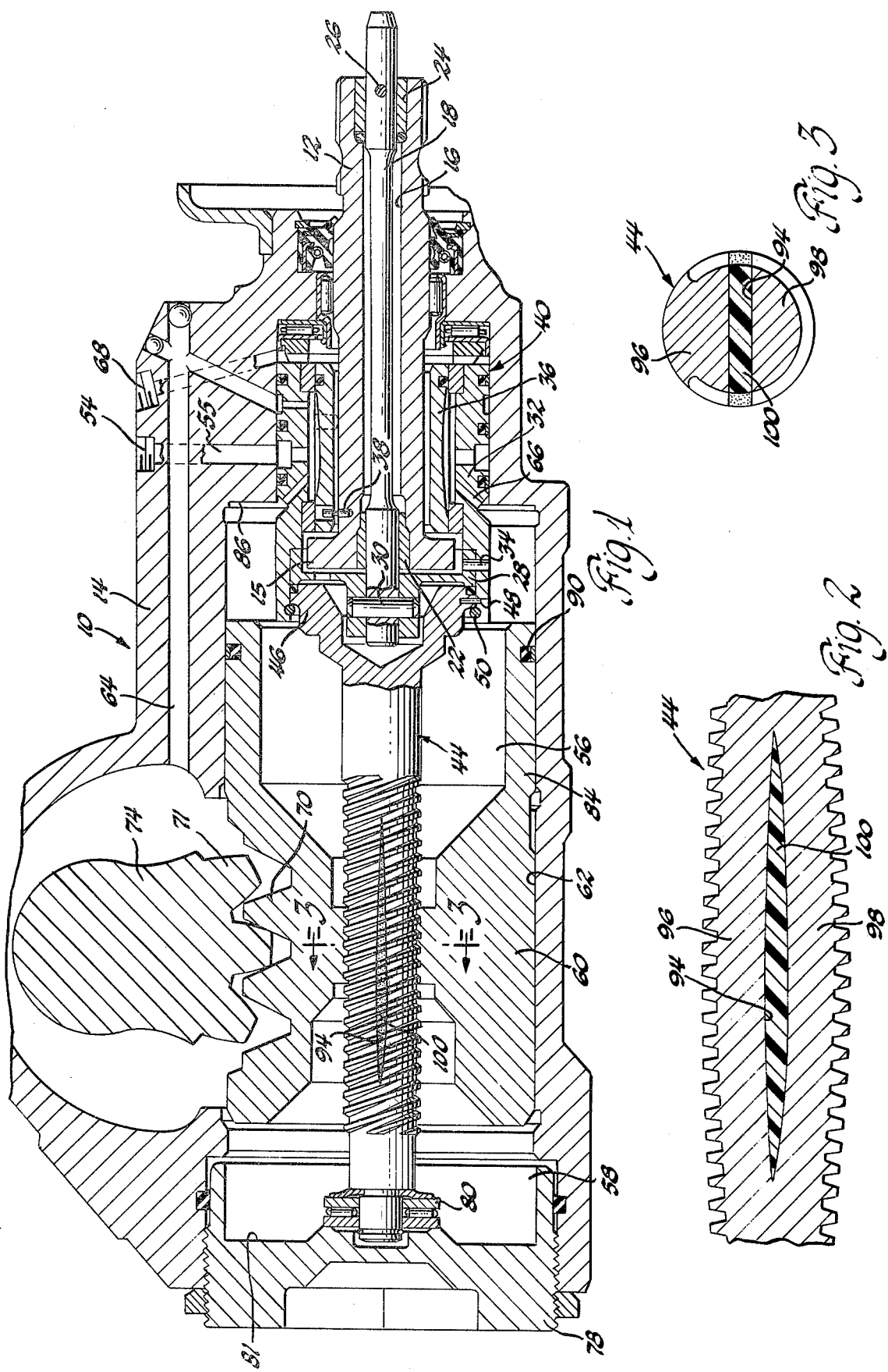

POWER STEERING GEAR WITH DELASHED PISTON NUT AND SCREW THREADING

This invention relates to delashing of meshing threaded members and more particularly to a new and improved power steering gear that utilizes plastic deformation of a steering gear screw to reduce the lash between the meshing threads of a piston nut and the screw for improving the operation of a rotary hydraulic valve integral with the gear.

Many hydraulic power steering gear systems for vehicles employ a hydraulically actuated piston nut having a rack for turning a sector gear that is operatively connected to the dirigible wheels of the vehicle through a steering linkage. Generally, these systems utilize hydraulic valving integral with the gear in which the turning resistance of the tires on the roadway dictates the degree of valve actuation required to build hydraulic pressures on the piston nut that provide the power assist forces required to perform the desired steering maneuver. These systems also employ an input driven screw which is threaded through the piston nut providing a mechanical drive connection from the input to the sector gear. The thread between the screw and piston nut forms part of the reaction system required for valve actuation. The physical lash present in the threaded connection between the piston nut and screw may cause a slight lay in response in the valving on handwheel movement. Generally this is because the screw threads in or out of the rack piston nut a minute distance until the threads of the screw bottom on the flanks of the threads of the piston nut. When this occurs, the input side of the integral valve is turned or otherwise displaced by further handwheel rotation as the output side of the valve is held stationary by the screw grounded through the sector gear to the road wheels. Hydraulic pressure builds in the system as gap closure in the valving produces resistance to pump flow. The selective connection of the piston nut pressure chambers with this pressure and to the exhaust port by the valving produces power assist steering with good response as will be understood by those skilled in this art. While the prior art power steering gears with such lash have provided effective and high quality power steering with good reliability it is an objective of this invention to make such gears even more efficient and more effective.

The present invention is drawn generally to the substantial reduction of lash from steering gear assemblies utilizing an acme thread on the steering worm to convert rotary motion of the worm into linear motion of the piston nut. More specifically, this proposal utilizes plastic deformation of the steering gear worm itself to produce a closer fit between the mating helical threads of the piston nut and screw when the steering gear is in a straight ahead steer condition. Although preferably threaded full length in conventional fashion, the screw is slotted axially and deformed so that its center section takes a slight barrel shape. In operation, when the barreled center portion of the screw traverses through the threaded portion of the piston nut, the sides of the screw are sprung inwardly ensuring a reduced lash thread fit. Since the amount of inward springing or squeezing by the piston nut is not sufficient to permanently set the screw, the spring action is retained for long term service in compensating for lash and any wear occurring in service. To effectively hydraulically seal the piston nut chambers from one another, a suitable elastomer is molded into the screw slot. This elastomer forms a deflectable seal in the helical thread of the screw to permit the desired screw deflections when threaded through the piston nut.

With this construction, the screw of the power steering gear provides quicker reaction for the output of the rotary valve allowing the input side of the valve to be immediately rotated relative thereto by the vehicle operator. On rotation of the input, the valve is instantaneously actuated to accelerate the hydraulic actuation of the piston nut and the powered turning of the output sector gear driven by the piston nut. In the preferred embodiment of this invention, the anti-lash feature provides improved valve reaction only when the gear is conditioned for a straight ahead mode of operation so that after a cornering maneuver there is no additional thread friction force to be overcome when the handwheel turning force is released and the gear returns toward its centered position.

Accordingly, it is a feature, object and advantage of this invention to provide a new and improved integral power steering gear having an elongated input driven screw which is axially slotted and has a slight barrel shape so that its sides are resiliently sprung to produce a delashed thread connection when the screw is threaded into the piston nut of the gear to optimize power steering gear valve operation.

Another feature, object and advantage of this invention is to provide a new and improved power steering gear having an integral valve arrangement with relatively rotatable valve parts in which one of the valve parts is grounded with respect to the other of the valve parts by a relatively lash-free thread connection between the piston nut and screw provided by the spring action of a slotted screw threaded through the piston nut.

Another feature, object and advantage of this invention is to provide a new and improved power steering gear featuring a piston nut drivingly connected to a steering output yieldably held in a centered position by a sprung power steering screw threaded through the nut to hold one power steering gear valve element relative to another for optimized gear responsiveness when executing steering from a centered position of the gear.

These and other features, objects and advantages of this invention will be more apparent from the following detailed description and drawing in which:

FIG. 1 is a side view primarily in section of an integral power steering gear in accordance with this invention;

FIG. 2 is an enlarged sectional view of a portion of the screw of the power steering gear of FIG. 1; and FIG. 3 is a view taken along lines 3—3 of FIG. 1 showing a cross section of the screw of the power steering gear of FIG. 1.

Turning now in greater detail to the drawings, there is shown in FIG. 1 a power steering gear 10 having an elongated stub shaft 12 mounted for turning movement in a steering gear housing 14 and terminating in an enlarged head portion 15. The stub shaft has an axial passage 16 therethrough which receives a torsion bar 18 supported for twisting movement therein by bearings 22 and 24. The outer end of the torsion bar is secured by pin 26 to the stub shaft 12 while the inner end is drivingly connected to an annular end cap 28 by a connector pin 30. The end cap 28 is in turn operatively connected to a cylindrical valve body 32 by radial connector pin 34. The valve body 32 extends axially in the housing and is supported for limited turning movement therein with respect to an open center valve spool 36 located inwardly concentric with respect to the valve body 32. The valve spool 36 is drivingly connected to the stub shaft 12 by radial pin 38 for turning movement therewith.

The valve body and valve spool being yieldably interconnected by the torsion bar are relatively rotatable with respect to each other when the valve body is grounded and when there is turning movement of the stub shaft from the handwheel, not shown. The valve body and spool form a valve assembly 40 controlling the hydraulic operation of the steering gear as more fully explained in U.S. Pat. No. 3,022,772 issued Feb. 27, 1962 to B. B. Zeigler et al for Rotary Power Steering Valve with Torsion Bar Centering and in U.S. Pat. No. 4,009,641 to Robert P. Rohde et al for Compact Power Steering Gear. These disclosures are hereby incorporated into this specification by reference.

An elongated steel screw or worm 44 has a shank portion that extends axially in the housing 14 from the inboard end of valve assembly 40. As shown, the screw has an enlarged annular head 46 which nests within the inner end of the valve body 32 and which is secured thereto by pin and slot means 48 and by a retainer ring 50. These connections prevent axial separation of the screw and the valve body as well as their relative rotation. The screw 44 is also operatively connected to the head portion 15 of the stub shaft 12 by a suitable lost motion mechanism which is known in the art and is fully described in the patents to Zeigler et al and Rohde et al identified above.

The valve assembly 40 is fed with pressure fluid from a power steering pump, not shown, through a pressure port 54 and connected inlet passage 55. The valve assembly controls the supply and exhaust of pressure fluid to and from pressure chambers 56 and 58 formed on either side of a generally cylindrical piston nut 60 of steel slidably mounted in a bore 62 formed in housing 14. Passage 64 in the housing 14, hydraulically connects the chamber 58 with the valve assembly 40 and passage 66 in the valve body 32 hydraulically connects chamber 56 with the valve assembly. Return port 68 is an exhaust for conducting fluid from the valve assembly 40 back to the power steering sump and pump as more fully described in the above referenced patents to Zeigler et al and Rohde et al.

The piston nut 60 has a rack whose teeth 70 mesh with the teeth 71 of a sector gear 74 mounted for limited turning movement in housing 14. The sector gear 74 is operatively connected through a pitman shaft and an associated steering linkage to the dirigible wheels of the vehicle, which are not shown.

The steering gear housing 14 is closed by an adjuster plug 78 threaded into one end thereof. As shown, the screw 44 extends axially into the housing and is supported at one end by a thrust bearing assembly 80 operatively disposed between the adjuster plug and a shoulder on screw 44. The interior radial wall 81 of this plug serves as a stop to limit the stroke of the piston nut in moving to the left. The screw 44 is threaded through the piston nut 60 and as shown in FIG. 1, may have multiple start helical threads which mesh with corresponding helical threads in the piston nut. The piston nut 60 has a cylindrical skirt 84 which extends axially in the bore 62 toward the radial end wall 86 formed in housing 14 at one end of bore 62. This end wall serves as a limit stop for the piston nut when fully stroked to the right in viewing FIG. 1. Disposed in an annular groove adjacent to the end of the skirt is an annular seal 90 which contacts the inner wall of bore 62 and provides the outer seal for fluid chambers 56 and 58.

In this invention, an axial slot 94 is cut or otherwise formed into the screw 44 by suitable tooling, not shown. This slotting deforms and bulges the screw into a slight barrel-shape configuration as best shown in FIG. 2 and in effect divides the central portion of the screw into two opposing semi-cylindrical spring halves or sides 96 and 98. When the screw is threaded into the nut, the outwardly bulging sides 96 and 98 of the screw are squeezed inwardly so that the flank clearances between the meshing helical threads of the screw and piston nut are eliminated or substantially reduced to thereby reduce thread lash. Since the amount of squeezing exerted by the piston nut on the metallic spring sides of the screw is not sufficient to permanently set the screw back to its original pre-slotted and cylindrical configuration, the radial spring action exerted by the centered barreled portion of the screw compensates for any wear in the threaded connection which normally occurs in extended service life.

In any event, with lash substantially reduced or eliminated between the piston nut and screw, the valve body is grounded lash-free through the threaded connection of the screw with the piston nut and through the gear sector and conventional steering linkage to the dirigible road wheels. With the valve body grounded, input turning movement initiated by handwheel actuation of the stub shaft will effect immediate relative rotation of the valve body and valve spool for appropriate conditioning of the piston nut for the hydraulic power assist turns as described in the above referenced patent to Zeigler et al. With this construction, there is optimized response to the handwheel input for power assist steering from the centered straight ahead steer position. As the piston nut moves left or right off of its centered position, lash compensation progressively diminishes. After a turn has been executed and with the piston nut displaced to the left or right, the valve is centered by the torsion bar. For return to straight ahead drive, the handwheel grip is loosened to allow the steering geometry to again move the piston nut to the centered position. In the preferred embodiment, the anti-lash provision of this invention does not add to any centering loads until the nut again reaches the bulged center of the screw thread at which point the nut approaches the straight ahead steer position.

In this invention, there is an improved fluid sealing between the threads of the piston nut and screw. As best shown in FIGS. 2 and 3, an elastomer insert 100 is molded into the elongated slot in the screw to fill the slot and form a yieldable threaded fitting meshing with the threads of the piston nut. With the meshing helical threads and cooperating elastomer insert, there is minimal leak path through the threaded connection between the screw and the piston nut to provide for improved sealing of chambers 56 and 58. The elastomer is displaceable to permit the desired deflection of the bulged center portion of the screw as it is threaded into and out of the piston nut. When deflected, the elastomer flows outwardly of the slot into close resilient engagement with the helical thread of the nut for tight sealing.

From the above it will be understood and appreciated that this invention provides for a new and improved power steering gear with provision for improved operation of the valving construction for optimized responsiveness in the valve from steering wheel input. With more responsive valve operation and improved piston nut sealing, there will be resulting improved and more efficient power gear operation as compared to many prior art devices.

While a preferred embodiment of this invention has been shown and described to illustrate the invention, other embodiments will become more apparent to those skilled in the art. Accordingly, the scope of this invention is set forth in the following claims.

I claim:

1. A power steering gear comprising a housing, an input member and an output member, said input and output members operatively mounted for turning movement in said housing, piston means drivingly connected to said output member mounted for longitudinal sliding movement in said housing and cooperating therewith to provide a pair of fluid pressure chambers, said piston means having an internal opening extending axially therethrough, a helical thread on the wall of said opening, a rotatable screw having a cylindrical shank portion extending through said opening, said shank portion having a helical thread that meshes with the thread of said piston means, valve means for controlling pressure fluid from a source of fluid pressure to said pressure chambers, said valve means comprising first and second valve elements, said first valve element being retarded from rotation by connection to said output member through the threaded connection of said piston means and said shank portion, said second valve element being operatively connected to said input member and rotatable relative to said first valve element in response to rotation of said input member so that said valve means controls the supply and exhaust of pressurized fluid to and from said chambers for the hydraulically powered movement of said piston means, said shank portion being axially slotted so that said shank portion has a radially expanded and outwardly sprung central portion, said central portion providing a reduced lash fit with said piston means by the inward constriction of said central portion by the piston means threaded thereon to thereby permit the immediate relative movement of said valve elements in response to turning movement of said input member, and elastomer seal means supported by said central portion of said shank portion for engaging the helical thread in the wall of said opening for hydraulically sealing said fluid pressure chambers with respect to one another.

2. A power steering gear comprising a housing, an input member and output member, said input and output members operatively mounted for turning movement in said housing, piston means drivingly connected to said output member mounted for longitudinal sliding movement in said housing and cooperating therewith to provide a pair of fluid pressure chambers, said piston means having an internal opening extending therethrough, said opening having a helical thread on the inner wall thereof, an elongated rotatable screw extending axially through said opening and having an external thread meshing with the helical thread of said piston means, valve means for controlling pressure fluid from a source of fluid pressure to said pressure chambers, said valve means comprising first and second valve elements, said first valve element being retarded from turning movement by its connection to said output member through the threaded connection of said piston means and said screw, said second valve element being operatively connected to said input member and rotatable relative to said first valve element in response to rotation of said input member so that said valve means controls the supply and exhaust of fluid to and from said chambers for the hydraulic powered movement of said piston means, said screw having an elongated axial slot formed therein to radially expand the central portion of said screw to provide a pair of outwardly sprung side portions and a delashed thread fit of said screw and piston means by the inward constriction of the screw by the piston means threaded thereon to thereby permit the immediate relative movement of said valve elements in response to turning movement of said input member and elastomer seal means supported in said axial slot for engaging said helical threads of said piston means to inhibit the flow of fluid between said pressure chambers.

3. A power steering gear comprising a housing, an input member and an output member, said input and output members being operatively mounted for turning movement in said housing, piston nut means drivingly connected to said output member mounted for longitudinal sliding movement in said housing and cooperating therewith to provide a pair of fluid pressure chambers, said piston nut means having an internal opening extending therethrough, said opening having a helical thread on the inner wall thereof, an elongated and rotatable screw having a helical thread and extending axially through said opening and having an external helical thread meshing with the helical thread of said piston nut means, valve means for controlling pressure fluid from a source of fluid pressure to said chambers for the hydraulic actuation of said piston nut means, said valve means comprising first and second valve elements, said first valve element being retarded from turning movement by connection to said output member through the threaded connection of said piston nut means and said screw, said second valve element being operatively connected to said input member and rotatable relative to said first valve element in response to rotation of said input member so that said valve means controls the supply and exhaust of fluid to and from said chamber for the hydraulic powered movement of said piston nut means, said screw having an elongated axial slot formed therein to radially expand a central portion of said screw to provide outwardly sprung sides and a delashed thread fit of said screw and piston nut means by the inward constriction of said sides by the piston nut means threaded on the central portion of the screw to thereby permit immediate relative movement of said valve elements in response to said turning movement of said input member, and elastomer means filling said elongated axial slot and being deflectable on constriction of the central portion of said screw to engage the threads on said nut to provide elastomer sealing means cooperating with said meshing helical threads to hydraulically seal said chambers from each other.

* * * * *